(12) United States Patent
Gau

(10) Patent No.: US 7,526,282 B2
(45) Date of Patent: Apr. 28, 2009

(54) METHOD OF CONTROLLING MULTIPLE CALLS OF COMMUNICATION DEVICE

(75) Inventor: Yi-Lun Gau, Taipei (TW)

(73) Assignee: Mediatek Inc., Hsinchu (TW)

( * ) Notice: Subject to any disclaimer, the term of this patent is extended or adjusted under 35 U.S.C. 154(b) by 797 days.

(21) Appl. No.: 11/000,015

(22) Filed: Dec. 1, 2004

(65) Prior Publication Data

US 2005/0123116 A1 Jun. 9, 2005

(30) Foreign Application Priority Data

Dec. 5, 2003 (TW) ............... 92134471 A
Aug. 2, 2004 (TW) ............... 93123142 A

(51) Int. Cl.
*H04M 3/42* (2006.01)
(52) U.S. Cl. .................. 455/416; 455/556.2; 455/518; 455/566; 379/202.01
(58) Field of Classification Search ........ 455/416, 455/154.2, 158.4, 158.5, 417, 445, 457, 518, 455/519, 566, 567, 556.2; 379/202.01, 203.01, 379/88.11, 93.23, 428.03
See application file for complete search history.

(56) References Cited

U.S. PATENT DOCUMENTS 6,965,786 B2* 11/2005 Qu et al. ................. 455/566
7,245,941 B2* 7/2007 Scott ....................... 455/566
2003/0073430 A1* 4/2003 Robertson et al. ......... 455/416
2005/0020316 A1* 1/2005 Mahini ..................... 455/566

OTHER PUBLICATIONS

Samsung Electronic Co., Ltd., "Owner's Manual of Dual Band GSM Telephone SGH-T408 Instructions," pp. 30-35 (English & Chinese), Mar. 2003, http://downloadcenter.samsung.com/content/UM/200308/20030830171546000_T408Taiwanese.pdf.

* cited by examiner

*Primary Examiner*—Matthew D Anderson
*Assistant Examiner*—Shaima Q Aminzay
(74) *Attorney, Agent, or Firm*—Bacon & Thomas, PLLC

(57) ABSTRACT

A method of controlling multiple calls of a communication device is provided. The method includes the steps below. Firstly, display P remote parties currently connected with the communication device, wherein the P remote parties form Q calls whose number and status determine a call menu including M options, where M is a positive integer. Next, select one of the remote parties, and select N options applicable to the selected remote party from the M options according to the selected remote party, wherein the N options are defined as N applicable options, where N is a positive integer. After that, display the N applicable options corresponding to the selected remote party. Following that, select one of N applicable options, and execute the selected applicable option corresponding to the selected remote party.

17 Claims, 6 Drawing Sheets

METHOD OF CONTROLLING MULTIPLE CALLS OF COMMUNICATION DEVICE

This application claims the benefit of Taiwan applications, Serial No. 92134471, filed Dec. 5, 2003, and Serial No. 93123142, filed Aug. 2, 2004, the subject matter of which is incorporated herein by reference.

BACKGROUND OF THE INVENTION

1. Field of the Invention

The invention relates in general to a multiple call controlling method, and more particularly to a method of controlling multiple calls of a communication device.

2. Description of the Related Art

Currently, mobile phones provide users with the function of connecting with more than one remote party to establish a multiple call. Corresponding to the function, a mobile phone must provide the user with a mechanism for controlling the calls. For ordinary mobile phones complying with GSM specification, the GSM specification defines up to two established calls and one waiting call at the same time. Of the two established calls, one is active, while the other is held, and only one of the two calls can be a conference call.

In the conventional method of controlling multiple calls, for control options provided in a mobile phone, all current remote parties of the mobile phone are taken as a whole. The conventional mobile phone generates different menus according to different combinations of the calls. However, each menu generated is applicable to all of the remote parties. No matter which remote party is selected by the user, the menu generated will be the same. Moreover, after entering into the menu, the user must further select one of the presented options. Following that, the mobile phone will return to the original frame displaying multiple remote parties, and ask the user to reselect a remote party to execute the selected option corresponding to the remote party.

Referring to FIGS. 1A~1B, diagrams of the call status frame and call menu frame of a mobile phone when a conventional method of controlling multiple calls is executed are shown. Refer to FIG. 1A, assume that currently the mobile phone remains connected with a remote party 1 and a remote party 2, the status of the remote party 1 is a single active call status A, and the status of the remote party 2 is a single held call status H.

If the user highlights and selects the remote party 1, and presses a select key, the mobile phone will proceed to the call menu frame as shown in FIG. 1B. In the call menu frame of FIG. 1B, the mobile phone displays all of the options applicable to both the remote party 1 and the remote party 2, including a hold option, a retrieve option and an end option, for selection. If the user highlights and selects the hold option and presses an enter key, the mobile phone will return to the call status frame as shown in FIG. 1A, and the user must reselect the remote party 1 upon which the operation of the hold option is performed. After that, the call established between the mobile phone and the remote party 1 will be held.

However, conventional technology has its disadvantages. The call menu includes not only the options applicable to the remote party 1 and the options applicable to the remote party 2, but also the options applicable to both the remote party 1 and the remote party 2. Since a large number of options are displayed, the user has to spend more time finding the desired option. Moreover, incorrect selection might result in a serious problem in conventional technology. For example, if the user selects the retrieve option in FIG. 1B and selects the remote party 1 in FIG. 1A, the user will be asked to re-select a remote party or re-select an option from the call menu because the retrieve option is inapplicable to the remote party 1 of the single active call status A. The user will have to spend more time reselecting a desired option.

Especially, when one of the established calls is a conference formed by multiple remote parties, the call menu frame will list even more options. The user will have to spend more time pressing an up/down key to select a desired option. Moreover, for those users who are not familiar with the practice, an incorrect selection of option will lead to a higher probability of re-selection of remote parties or options. Thus, the user is likely to spend more communication fee or suffer call interruption due to incorrect operation, which is indeed very inconvenient.

SUMMARY OF THE INVENTION

It is therefore an object of the invention to provide a multiple call controlling method of a communication device for the user to quickly select appropriate option so as to reduce selection time and the probability of making an incorrect selection.

The invention achieves the above-identified object by providing a multiple calls controlling method of a communication device including the steps below. Firstly, display P remote parties currently connected with the communication device, wherein the P remote parties form Q calls whose number and status determine a call menu including M options, where M is a positive integer. Next, select one of the remote parties, and select N options applicable to the selected remote party from the M options according to the selected remote party, wherein the N options are defined as N applicable options, where N is a positive integer. After that, display the N applicable options corresponding to the selected remote party. Following that, select one of the N applicable options, and execute the selected applicable option corresponding to the selected remote party.

Other objects, features, and advantages of the invention will become apparent from the following detailed description of the preferred but non-limiting embodiments. The following description is made with reference to the accompanying drawings.

DETAILED DESCRIPTION OF THE INVENTION

EMBODIMENT ONE

Figure 1A:
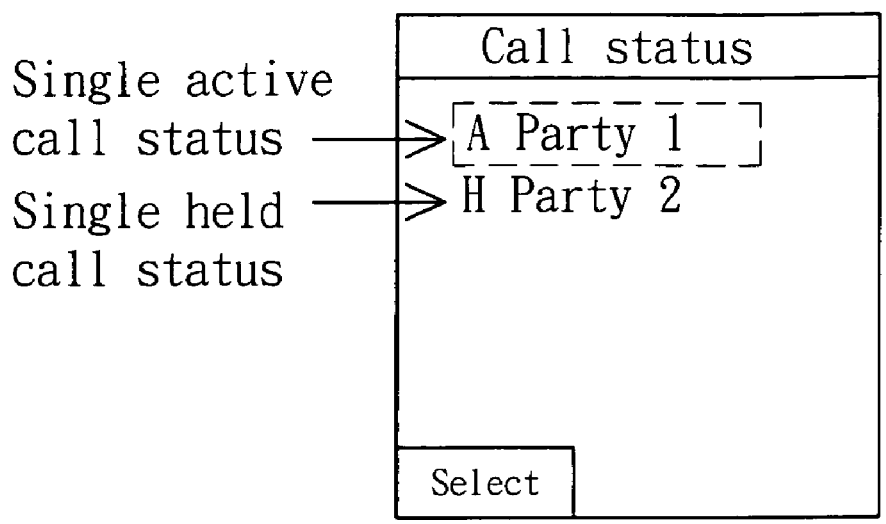
FIGS. 1A~1B are diagrams of the call status frame and call menu frame of a mobile phone when a conventional method of controlling multiple calls is executed.
Figure 1B:
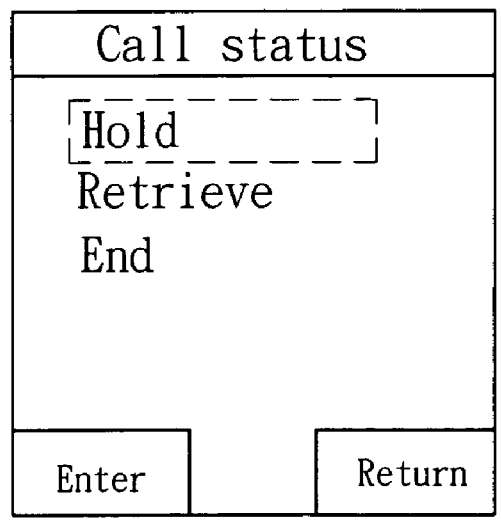
Figure 2:
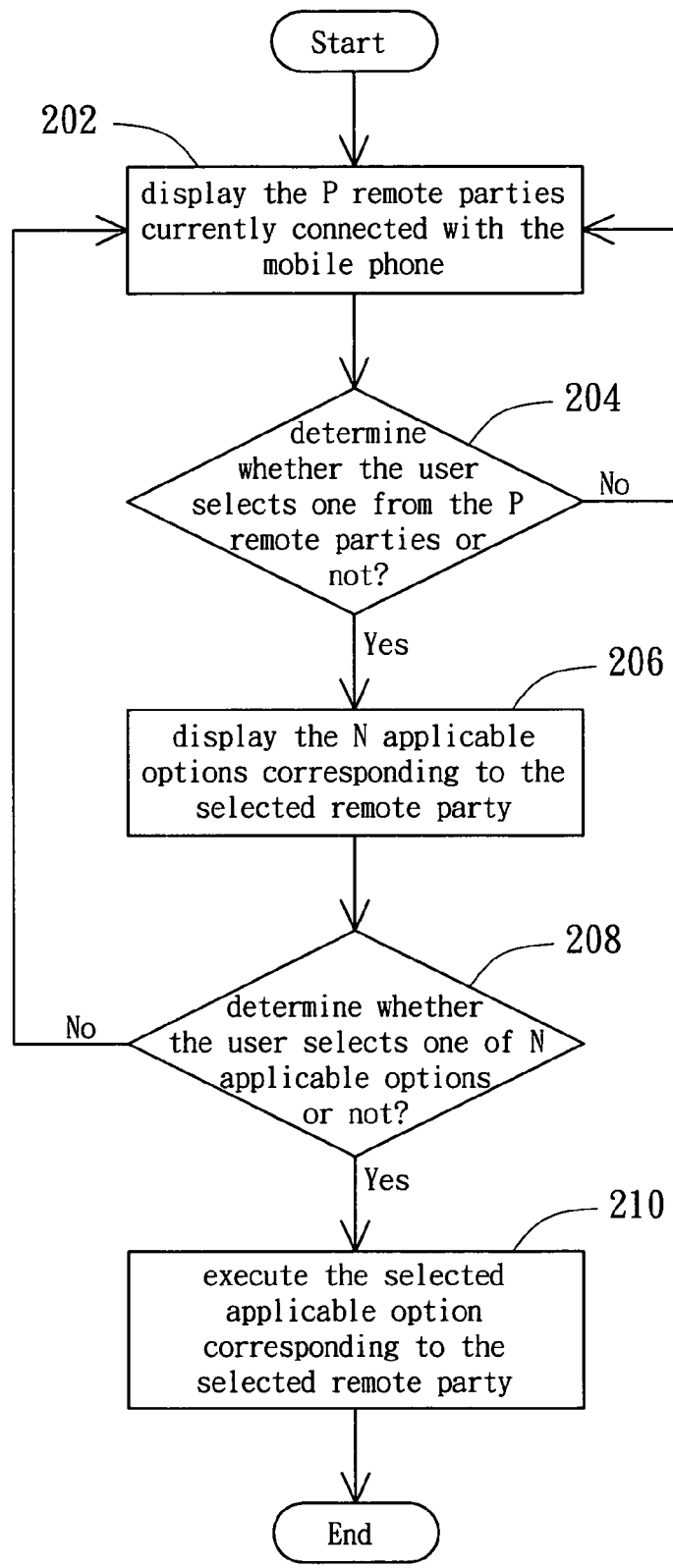
FIG. 2 is a flowchart of a method of controlling multiple calls for a communication device according to first embodiment of the invention.

Referring to FIG. 2, a flowchart of a method of controlling multiple calls of a communication device according to a first embodiment of the invention is shown. The communication device can be a mobile phone, a home line, or a wireless telephone for instance. Herein, the communication device of the invention is exemplified by a mobile phone. The method is applied in a man machine interface of a mobile phone. Firstly, in the step 202, the P remote parties currently communicating with the mobile phone and the status of the P remote parties are displayed on the call status frame of the display screen of the mobile phone for selection. The P remote parties form Q calls. The number and status of the Q calls determine a call menu including M options, where M is a positive integer.

Next, in the step 204, whether one of the P remote parties is selected or not is determined: if so, proceed to step 206, otherwise, return to step 202.

In step 206, N options applicable to the selected remote party from the M options according to the selected remote party are selected, wherein the N options are defined as N applicable options, where N is a positive integer. In addition, the N applicable options corresponding to the selected remote party on the call menu frame of the display screen of the mobile phone for selection are displayed. Next, proceed to step 208 to determine whether one of the N applicable options is selected: if so, proceed to step 210, otherwise, return to step 202, i.e., return to the previous frame. In the step 210, the mobile phone executes the selected applicable option corresponding to the selected remote party.

In the above step 204, after one of the P remote parties is selected, according to the status of the call corresponding to the selected remote party, the mobile phone preferably sequentially determines whether every option of the M options is applicable to the remote party: if applicable, set the option as an applicable option; otherwise, hide the option. In step 206, any options other than the N applicable options are not displayed on call menu frame for selection. Therefore, the user will not select any options other than the N applicable options.

The above mobile phone is preferably a mobile phone complying with GSM specification. The above option is a hold option, a retrieve option, a swap option, an end option, a conference option, a split option or a transferring option for instance.

If no waiting call is generated in a mobile phone complying with GSM specification, the Q value equals 2. Thus, at most one of the 2 calls is a multiparty call. Each of the two calls can be in a single active call status, a single held call status, an active multiparty call status or a held multiparty call status.

Figure 3A:
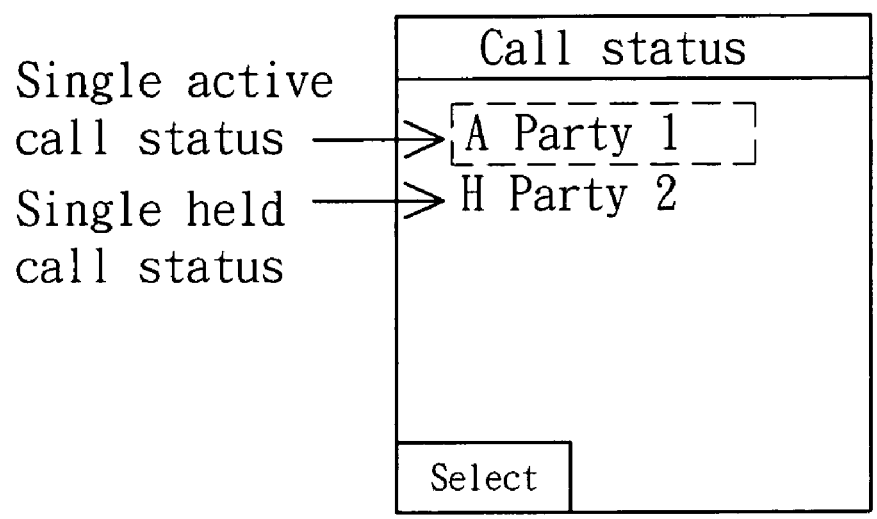
FIGS. 3A~3B are perspective diagrams of the call status frame and call menu frame displayed on a mobile phone when a method for controlling multiple calls according to example one of embodiment one is executed.
Figure 3B:
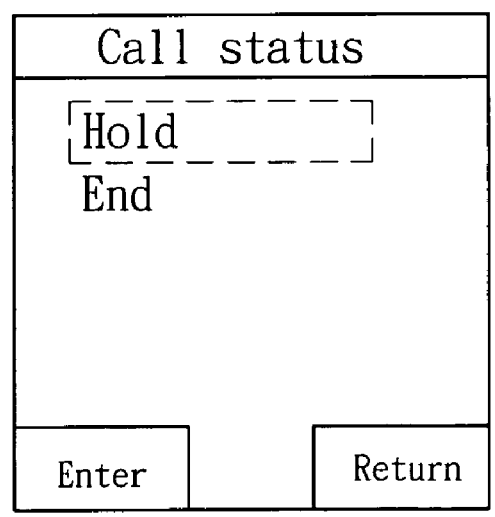

Referring to FIGS. 3A~3B, perspective diagrams of the call status frame and call menu frame displayed on a mobile phone when a method for controlling multiple calls according to the example one of embodiment one is executed are shown. Referring to FIG. 3A, the mobile phone is assumed to stay connected with a remote party 1 and a remote party 2. The remote party 1 is in a single active call status A, while the remote party 2 is in a single held status H.

After the user highlights and selects the remote party 1, and presses the selection key, the call menu will be displayed on the mobile phone as shown in FIG. 3B. In the call menu frame of FIG. 3B, only the options applicable to the remote party 1 are displayed on the mobile phone for selection, such as the hold option and the end option for instance. If the user highlights and selects the hold option, and presses the enter key, the mobile phone will directly hold the call connected with the remote party 1. In the above call select frame, the mobile phone will not display the retrieve option that is inapplicable to the remote party 1 for selection. The user cannot select the retrieve option. Therefore, incorrect selection can be avoided and the selection speed can be increased.

If the user selects the remote party 2, the mobile phone will display on the call menu frame only the options applicable to the remote party 2, such as the retrieve option and the end option (not shown here) for instance. The hold option is hidden, so that the user cannot select the hold option. Thus, incorrect selection can be avoided and the selection speed can be increased.

Since only the options applicable to the selected remote party are displayed on the call menu frame, users can quickly select the desired option whereas, conventionally, users might not select an applicable option or might select an incorrect option and need to reselect again and again. In addition, after users select the desired option, the present preferred embodiment can directly execute the option corresponding to the selected remote party whereas conventionally, users have to return to the previous frame, i.e., the call status frame, to re-select the remote party which executes the option. Therefore the present preferred embodiment can further speed up the execution of the option.

Figure 4A:
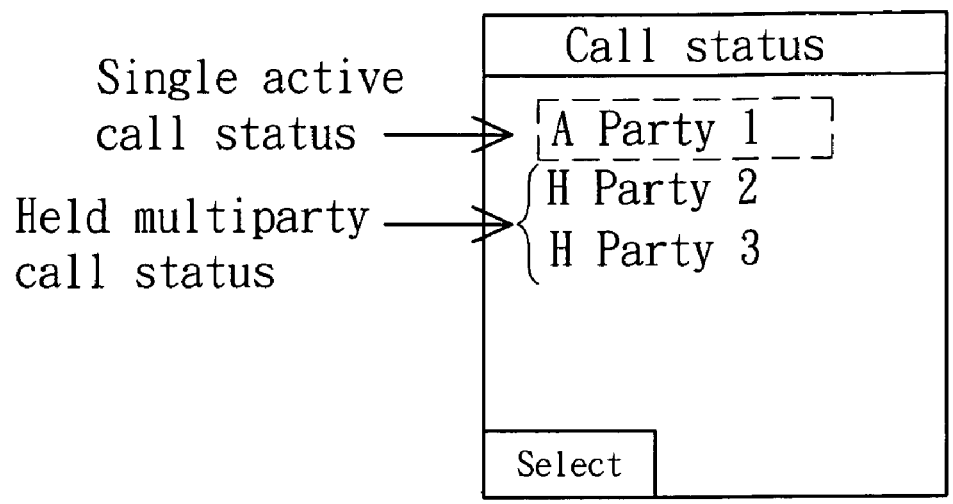
FIGS. 4A~5B are diagrams of the call status frame and call menu frame of a mobile phone when a method of controlling multiple calls according to example two of first embodiment is executed.

To further elaborate the present preferred embodiment, an example is exemplified. Referring to FIGS. 4A~5B, perspective diagrams of the call status frame and call menu frame of a mobile phone when a method of controlling multiple calls according to example two of first embodiment is executed are shown. Referring to FIG. 4A, the mobile phone is assumed to be currently connected with the remote party 1, the remote party 2 and the remote party 3, wherein the remote party 1 is in a single active call status A, the remote party 2 and the remote party 3 form an conference call, which is in a held multiparty call status H.

Figure 4B:
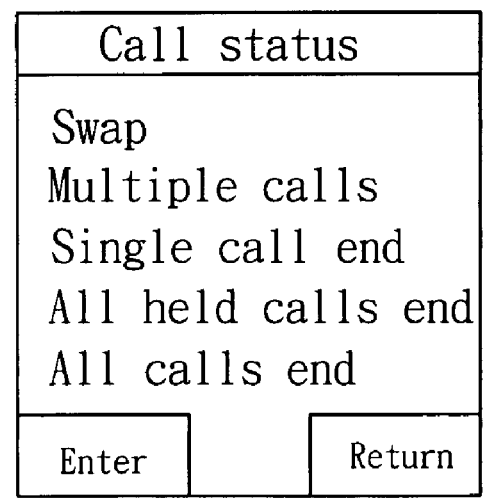

After the user highlights and selects the remote party 1, and presses the select key, the mobile phone will proceed to the call menu frame as shown in FIG. 4B. The mobile phone only displays the options applicable to the remote party 1, such as the swap option, the conference option, the single active call end option, the all held call end option and all call end option. After the user selects one of the options and presses the enter key, the mobile phone will directly execute the selected option of the call corresponding to the remote party 1. The above swap option is to swap status of the remote party 1 with the status of the conference call formed by the remote party 2 and the remote party 3. While the conference option is for the remote party 1 to join the conference by the remote party 2 and the remote party 3, the single active call end option is to end the call of the remote party 1. The all held cal end option is to end the connection between the remote party 2 and the remote party 3, while the all call end option is to end the connection with the remote parties 1~3.

Figure 5A:
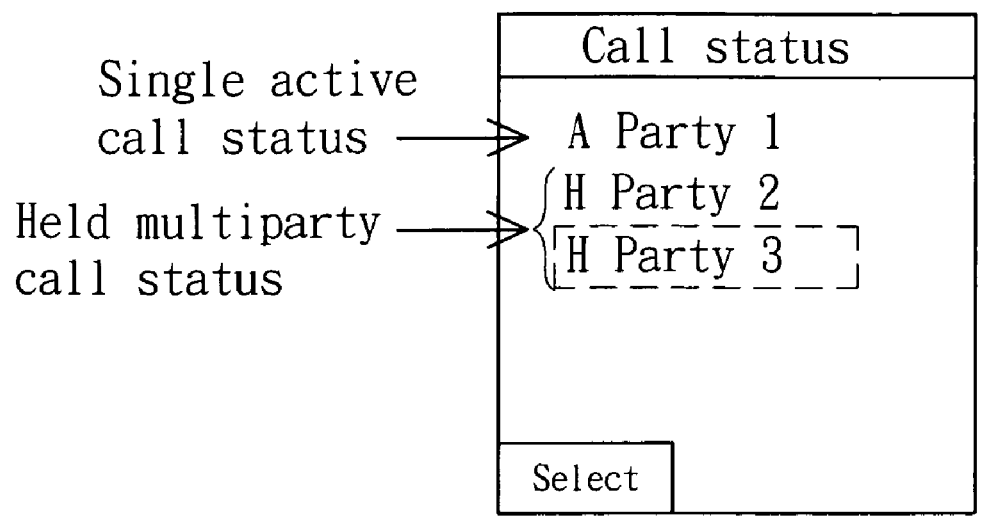
Figure 5B:
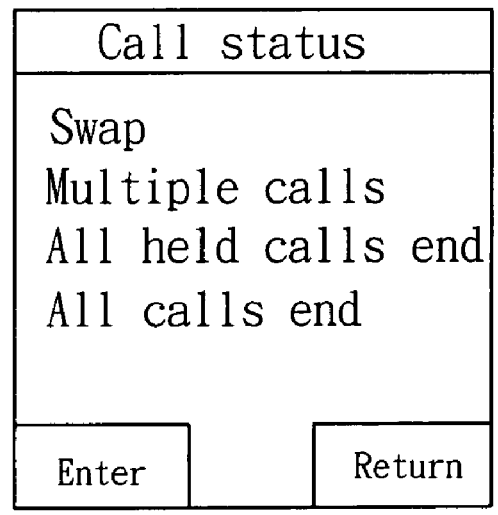

Refer to FIG. 5A. If the user selects the remote party 3, the mobile phone will display on the call menu frame only the options applicable to the remote party 3, such as the swap option, the conference option, the all held call end option and the all call end option as shown in FIG. 5B. Since the single active call end option is not applicable to the conference call formed by the remote party 2 and the remote party 3, the single active call end option has been hidden lest it might be selected. If the user selects another remote party 2 of the conference, the option displayed on the call menu frame is preferably the same with the option corresponding to the remote party 3

Figure 6:
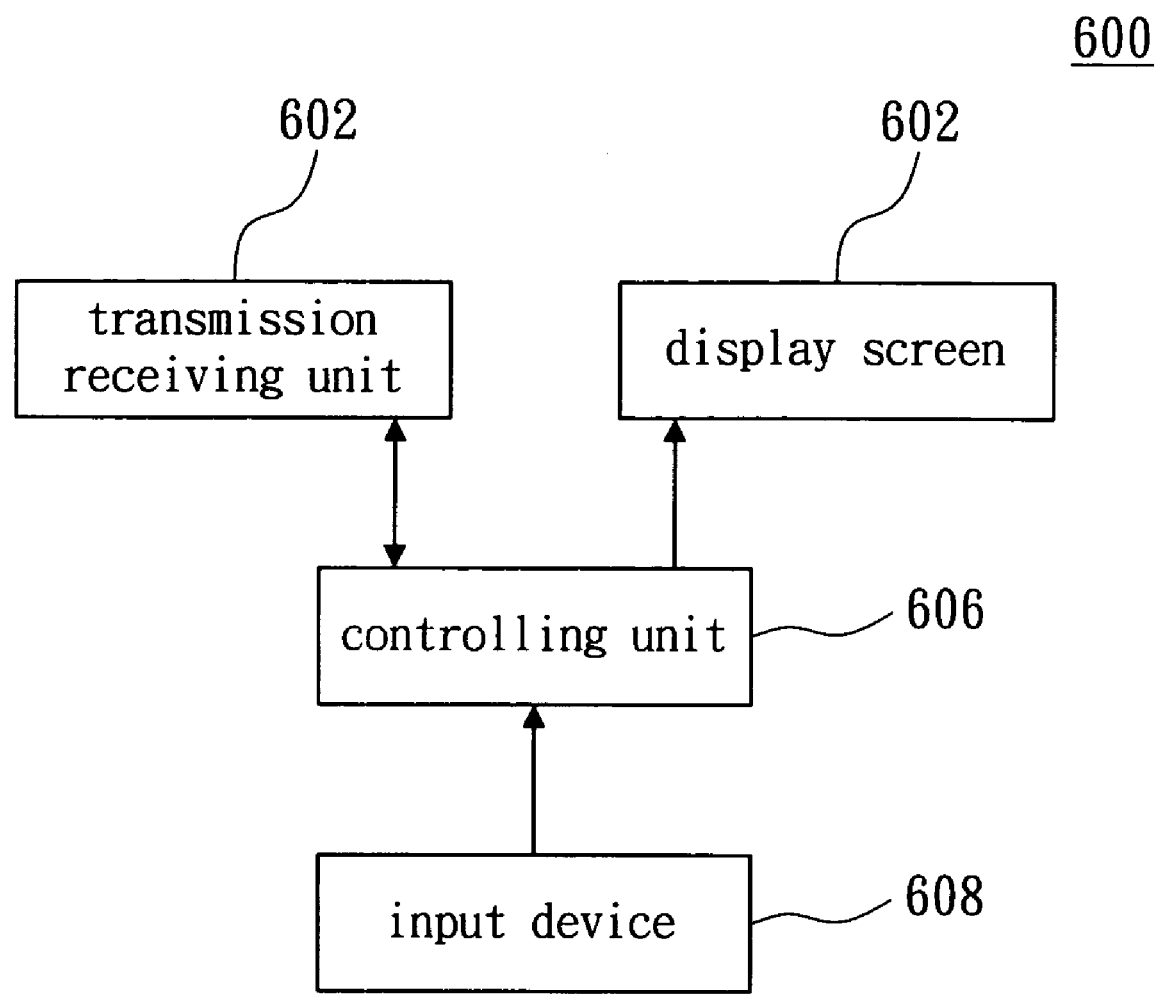
FIG. 6 is a block diagram of the communication device according to the multiple calls controlling method illustrated in FIG. 2.

Referring to FIG. 6, a block diagram of the communication device implementing the multiple calls controlling method according to embodiment one is shown. The communication device 600 includes a display screen 602, a transmission receiving unit 604, a controlling unit 606, and an input device 608. The transmission receiving unit is for connecting with the multiple remote parties. The controlling unit 606 is for controlling the display screen 602 and the transmission receiving unit 604. The controlling unit 606 is for executing steps 202 to 210 illustrated in FIG. 2. The input device 608 is for the user to operate.

PREFERRED EMBODIMENT TWO

Moreover, a multiple call controlling method of a mobile phone of the invention can directly display the current Q calls of the mobile phone on the call status for selection, instead of directly selecting the remote party as in the embodiment one. The method of the present embodiment includes the steps below. Firstly, display the current Q calls of the mobile phone, wherein the Q calls correspond to a call menu including M options, where M is a positive integer. Next, select one of Q calls. The N options of the M options are applicable to the selected call, wherein the N options are defined as N applicable options, where N is a positive integer. After that, display the N applicable options. Following that, after one of N applicable options is selected, execute the selected applicable option corresponding to the selected call.

In a multiple call controlling method of a mobile phone disclosed in the above preferred embodiment of the invention, only the options applicable to the selected remote party or call are listed on the call menu frame, so that the user can quickly select the desired option. Moreover, for users who are not familiar with the method, inapplicable options will not be selected and therefore error selection can be avoided. Therefore, the invention achieves the object of enabling the user to quickly select appropriate option and reduce the time of selection and the probability of making an incorrect selection. Consequently, the method further saves the user communication fees and avoids call interruption due to incorrect operations during a call.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of controlling multiple calls for a communication device, comprising:
    (a) displaying P remote parties currently connected with the communication device, the P remote parties forming Q calls whose number and status determine a call menu comprising M options, wherein M is a positive integer, and the Q calls comprise at least one multiparty call including at least two of the P remote parties;
    (b) selecting one of the remote parties, and selecting N options applicable to the selected remote party from the M options according to the status of the call corresponding to the selected remote party, the N options being defined as N applicable options, where N is a positive integer, and the status of the call comprises a single active call status, a single held call status, an active multiparty call status and a held multiparty call status;
    (c) displaying the N applicable options corresponding to the selected remote party; and
    (d) selecting one of the N applicable options, and executing the selected applicable option corresponding to the selected remote party.

2. The method according to claim 1, wherein the communication device is a mobile phone complying with GSM specification.

3. The method according to claim 1, wherein one of the options is a hold option, a retrieve option, a swap option, an end option, a conference option, a split option or a transfer option.

4. The method according to claim 1, wherein the method is applied in a man machine interface of the communication device, in step (a), the remote parties are displayed on a first frame of a display screen of the communication device for selection; in step (c), the N applicable options are displayed on a second frame of the display screen for selection.

5. The method according to claim 4, wherein the step (b) further comprises, according to the status of the call corresponding to the selected remote party, sequentially determining whether every option of the M options is applicable to the remote party; if applicable, setting the option as an applicable option, otherwise, hiding the option; in step (c), options other than the N applicable options are not displayed on the second frame for selection.

6. A method of controlling multiple calls for a communication device, comprising:
    (a) displaying P remote parties currently connected with the communication device on a first frame of a display screen of the communication device for selection, the P remote parties forming Q calls whose number and status determine a call menu comprising M options, wherein M is a positive integer, and the Q calls comprise at least one multiparty call including at least two of the P remote parties;
    (b) selecting one of the remote parties, according to the status of the call corresponding to the selected remote party, sequentially determining whether every option of the M options is applicable to the selected remote party; if applicable, setting the option as an applicable option, otherwise, hiding the option, wherein the status of the call comprises a single active call status, a single held call status, an active multiparty call status and a held multiparty call status;
    (c) displaying the applicable options on a second frame of the display screen for selection, while options other than the applicable options are not displayed on the second frame for selection; and
    (d) selecting one of the applicable options, and executing the selected applicable option corresponding to the selected remote party by the communication device.

7. The method according to claim 6, wherein one of the options is a hold option, a retrieve option, a swap option, an end option, a conference option, a split option or a transfer option.

8. A method of controlling multiple calls for a communication device, comprising:
    (a) displaying current Q calls of the communication device, the Q calls corresponding to a call menu comprising M options, where M is a positive integer;
    (b) selecting one of the Q calls, and according to the selected call, selecting N options applicable to the selected remote party from the M options, the N options being defined as N applicable options, wherein N is a positive integer, and the Q calls comprise at least one multiparty call including at least two remote parties, and the status of the call comprises a single active call status, a single held call status, an active multiparty call status and a held multiparty call status;

(c) displaying the N applicable options; and (d) selecting one of the N applicable options, and executing the selected applicable option corresponding to the selected call.

9. The method according to claim 8, wherein the communication device is a mobile phone complying with GSM specification.

10. The method according to claim 8, wherein one of the options is a hold option, a retrieve option, a swap option, an end option, a conference option, a split option or a transfer option.

11. The method according to claim 8, wherein the method is applied in a man machine interface of the communication device, in step (a), the calls are displayed on a first frame of a display screen of the communication device for selection; in step (c), the N applicable options are displayed on a second frame of the display screen for selection.

12. The method according to claim 11, wherein step (b) further comprises sequentially determining whether every option of the M options is applicable to the selected call according to the status of the selected call; if applicable, setting the option as an applicable option, otherwise, hiding the option; in step (c), options other than the N applicable options are not displayed on the second frame for selection.

13. A communication device capable of controlling multiple calls, comprising:

a display screen;

a transmission receiving unit for connecting with a plurality of remote parties; and a controlling unit for controlling the display screen and the transmission receiving unit, the controlling unit being used for:

(a) controlling the display screen to display the remote parties currently connected with the communication device, the remote parties forming Q calls whose number and status determine a call menu comprising M options, wherein M is a positive integer, and the Q calls comprise at least one multiparty call including at least two of the remote parties;

(b) selecting one of the remote parties, and selecting N options applicable to the selected remote party from the M options according to the status of the call corresponding to the selected remote party, the N options being defined as N applicable options, where N is a positive integer, and the status of the call comprises a single active call status, a single held call status, an active multiparty call status and a held multiparty call status;

(c) controlling the display screen to display the N applicable options corresponding to the selected remote party; and (d) selecting one of the N applicable options, and executing the selected applicable option corresponding to the selected remote party.

14. The communication device according to claim 13, wherein the communication device is a mobile phone complying with GSM specification.

15. The communication device according to claim 13, wherein one of the options is a hold option, a retrieve option, a swap option, an end option, a conference option, a split option or a transfer option.

16. The communication device according to claim 13, wherein in step (a), the remote parties are displayed on a first frame of the display screen of the communication device for selection, while in step (c), the N applicable options are displayed on a second frame of the display screen for selection.

17. The communication device according to claim 16, wherein in step (b), the controlling unit further comprises sequentially determining whether every option of the M options is applicable to the selected remote party according to the status of the call corresponding to the selected remote party; if applicable, setting the option as an applicable option, otherwise, hiding the option; in step (c), options other than the N applicable options are not displayed on the second frame for selection.

* * * * *